(12) United States Patent
Cacace (10) Patent No.: US 8,225,951 B2
(45) Date of Patent: Jul. 24, 2012

(54) HYDRAULIC PRESSURIZING CONTAINMENT VESSEL AND METHOD OF USE THEREOF

(75) Inventor: Anthony Cacace, Haddam, CT (US)

(73) Assignee: GKN Aerospace Services Structures Corp., Cromwell, CT (US)

(*) Notice: Subject to any disclaimer, the term of this patent is extended or adjusted under 35 U.S.C. 154(b) by 49 days.

(21) Appl. No.: 12/958,803

(22) Filed: Dec. 2, 2010

(65) Prior Publication Data

US 2011/0163093 A1 Jul. 7, 2011

Related U.S. Application Data

(63) Continuation of application No. 11/451,300, filed on Jun. 13, 2006, now Pat. No. 7,866,499.

(60) Provisional application No. 60/690,151, filed on Jun. 14, 2005.

(51) Int. Cl.
*B65D 45/30* (2006.01)
*B65D 45/02* (2006.01)
(52) U.S. Cl. ....... 220/4.26; 220/4.24; 220/319; 220/686
(58) Field of Classification Search ................ 220/4.24, 220/319, 584, 686
See application file for complete search history.

(56) References Cited

U.S. PATENT DOCUMENTS

| | | | |
|---|---|---|---|
| 2,319,479 A | 5/1943 | Ryder | |
| 2,608,318 A | 8/1952 | Keller | |
| 4,466,551 A | 8/1984 | Leung | |
| 4,483,458 A | 11/1984 | Minning et al. | |
| 5,069,354 A | 12/1991 | Tannenbaum | |
| 5,878,907 A | 3/1999 | Graf | |
| 6,401,958 B1 | 6/2002 | Foss et al. | |
| 6,497,239 B2 | 12/2002 | Farmer et al. | |
| 7,036,673 B2 | 5/2006 | Jozaki | |
| 7,866,499 B2 * | 1/2011 | Cacace | 220/4.26 |
| 2008/0197130 A1 | 8/2008 | Volkmann | |

* cited by examiner

*Primary Examiner* — Mickey Yu
*Assistant Examiner* — Niki Eloshway
(74) *Attorney, Agent, or Firm* — Quarles & Brady LLP (57) ABSTRACT

A pressurizable chamber device or containment vessel and method of use thereof. The device or vessel includes two chamber portions, a lid portion and a base portion, drawn to one another via a nut portion. The lid and base portions each include concave surfaces that matingly fit together, such that an internal chamber is formed when these portions are fit together. The lid and base portions each include a flange having a groove therein, such that a flexible seal element is fittable into the groove. The lid and base portions include features to matingly engage the nut portion, such that engagement thereamong draws the lid portion and the base portion toward one another, tightly sealing the formed internal chamber. A pressure, such as a resin pressure that may be precisely regulated, may then be applied, for example, to a mold contained within the formed and tightly sealed chamber.

20 Claims, 7 Drawing Sheets

HYDRAULIC PRESSURIZING CONTAINMENT VESSEL AND METHOD OF USE THEREOF

CROSS-REFERENCE TO RELATED APPLICATION

This non-provisional application is a continuation of and claims the benefit of U.S. application Ser. No. 11/451,300, filed Jun. 13, 2006 and titled "Hydraulic Pressurizing Containment Vessel and Method of Use Thereof", which claims priority to Provisional Patent Application No. 60/690,151, filed Jun. 14, 2005 and titled "Hydraulic Pressurizing Containment Vessel and Method of Use Thereof". The disclosures of the prior applications are hereby incorporated herein in their entirety by reference.

This application claims priority to applicant's copending U.S. Provisional Patent Application Ser. No. 60/690,151 titled "HYDRAULIC PRESSURIZING CONTAINMENT VESSEL AND METHOD OF USE THEREOF" filed Jun. 14, 2005, the entirety of which is incorporated herein by reference.

The U.S. Government has a paid-up license in this invention and the right in limited circumstances to require the patent owner to license others on reasonable terms as provided for by the terms of contract No. N00019-02-C-3003 awarded by the Navy.

BACKGROUND OF THE INVENTION

1. Field of the Invention

The present invention relates to a device for containing and controlling extreme pressure used, for example, in a resin transfer system, and method of use thereof.

2. Background of the Related Art

There is a general need in the art of pressurized resin transfer molder and other product manufacture to provide containment vessels or chambers for containing up to extreme pressures resin and other product material contained therein. In the prior art, portions of such vessels or chambers are typically clamped or bolted together, and containment pressures are created by, for example, mechanically or hydraulically applying a press-driven force to the chamber or vessel contents. Problems with this approach include failures of the clamps or bolts and imprecision in the pressures produced and distributed within such chambers or vessels.

SUMMARY OF THE INVENTION

The present invention overcomes the above identified problems, as well as others, by providing a pressurizable chamber device or containment vessel and method of use thereof. In one embodiment, the present invention provides a vessel or chamber device that includes two chamber portions, also interchangeably referred to herein as a "first portion" (or "lid portion" or "top portion") and a "second portion" (or "base portion" or "bottom portion"), and a "ring portion," also interchangeably referred to herein as a "nut portion," In one embodiment, the lid portion and the base portion each include concave surfaces that matingly fit together, such that an internal chamber is formed by the combined concave surfaces of the lid and base portions when fit together.

In one embodiment, the lid and base portions each include at least one outer flange having a groove therein, such that a flexible seal element is fittable into the groove of both the lid portion and the base portion when matingly fit together, the flexible seal element maintaining a gap between the face of the lid portion and the face of the base portion when uncompressed, and the flexible seal element being compressible, such that, upon the lid portion and the base portion being drawn toward one another, the seal element is compressed, reducing the gap between the lid portion and the base portion, and thereby tightly sealing the internal chamber formed by the concave surfaces of the lid portion and the base portion. The lid and base portions include features to matingly engage the nut portion, such that engagement thereamong draws the lid portion and the base portion toward one another, tightly sealing the formed internal chamber. A pressure, such as a resin pressure that may be precisely regulated (e.g., via openings to the internal chamber and lines or other conduits connectable thereto for delivering pressurized fluid and/or other materials for use inside the internal chamber), may then be applied, for example, to a mold contained within the chamber, such as a mold containing resins and fibers for producing a molded part or other product.

In one embodiment, the outer flange of each of the lid portion and the base portion includes a plurality of teeth (also referred to interchangeably herein as "toothed extensions" or "dogs") extending therefrom, with a plurality of wedges being attached to or comprising each of such teeth, one wedge for each toothed extension. In other embodiments, only a portion of such teeth include wedges.

In a first exemplary embodiment of the present invention, the nut portion is ring-shaped, having an interior surface that includes a plurality of nut teeth arranged in two rows extending from the interior surface, a first row being located near a first side edge of the nut portion and the second row being located near the second side edge of the nut portion. In this embodiment, each nut tooth has an attached wedge, the attached wedges extending from the side of a nut tooth to which the wedge is attached in a direction opposite the side of the nut tooth located near the side edge of the nut portion. In other embodiments, only a portion of such nut teeth include wedges.

In the first exemplary embodiment, the top and base portions have generally circularly shaped flanges, and each row of the nut teeth is spaced such that the teeth extending from the generally circular flanges of the top and base portions may be passed therebetween into the inner portion of the nut portion, and, upon rotation of the nut portion relative to the top and base portions, the wedges on the nut teeth and the wedges on the flange teeth meshably engage, such that the top portion and the base portion are compressibly drawn toward one another between the two rows of nut teeth via passing of the wedges on the flange teeth of the top and base portions past the wedges on the nut teeth.

In the first exemplary embodiment, the rotation of the top and base portions relative to the nut portion may be made in any suitable manner, such as by fixably holding the position of the base portion and applying hydraulic pressure to the lid portion, such that rotation of the lid portion occurs relative to the base portion, the rotation of the lid portion tending to be opposed by the nut portion via the lid portion flange wedges engaging a first row of the nut wedges and the second row of nut wedges oppositely engaging the base portion flange wedges. Similarly, the top and base portions may be fixably held, for example, and the nut portion rotated relative thereto, such as via application of a hydraulic pressure.

In a second exemplary embodiment of the present invention, the base and lid portions have flanges extending on each of at least one pair of parallel sides, and the nut portion has at least one pair of parallel sides. Each side of the pair of parallel sides of the nut portion has a pair of generally parallel rows of spaced teeth, arranged in two rows extending from the interior surface, the first row being located near a first edge of the nut portion and the second row being located near a second edge of the nut portion. Each nut tooth has an attached wedge, the attached wedges extending from the side of each nut tooth to which the wedge is attached in a direction opposite the side of the nut tooth near the side edge of the nut portion.

The flange teeth for the base and lid portions likewise each include attached wedges, each row of the nut teeth also being spaced, such that the teeth extending from the flanges of the top and base portions may pass therebetween into the inner portion of the nut portion, and, upon sliding of the nut portion relative to the top and base portions, the wedges on the nut teeth and the wedges on the flange teeth meshably engage, such that the top portion and the base portion are compressibly drawn toward one another between the two rows of nut teeth via frictional sliding contact of the wedges on the flange teeth past the wedges on the nut teeth.

In the second exemplary embodiment, a generally linear motion is applied to the top and base portions relative to the nut portion, and this motion may be made in any suitable manner, such as by fixing the position of the base portion and by applying hydraulic pressure to the lid portion, such that generally linear motion of the lid portion occurs relative to the base portion, the generally linear motion of the lid portion tending to be opposed by the nut portion via the lid portion flange wedges engaging the first row of the nut wedges, and the second row of nut wedges being oppositely engaged via the base portion flange wedges.

Among other advantages, the present invention allows the containment vessel to be assembled and disassembled in much less time than prior art systems. In addition, the failure rate and number of failing components of the present invention are each much lower than prior art vessels that include clamps or bolts. Further, the replaceable wedges on the engaging teeth of some embodiments of the present invention allow simple, quick, and relatively inexpensive replacement of the component typically receiving the most wear in use.

Additional advantages and novel features of the invention will be set forth in part in the description that follows, and in part will become more apparent to those skilled in the art upon examination of the following or upon learning by practice of the invention.

DETAILED DESCRIPTION

The present invention provides a pressurizable chamber device or containment vessel and method of use thereof. In one embodiment, the present invention provides a vessel or chamber device that includes two chamber portions, a lid portion and a base portion, that are drawn toward one another via a nut portion. In one embodiment, the lid portion and the base portion each include concave surfaces that matingly fit together, such that an internal chamber is formed by the combined concave surfaces of the lid and base portions when fit together.

Figure 1:
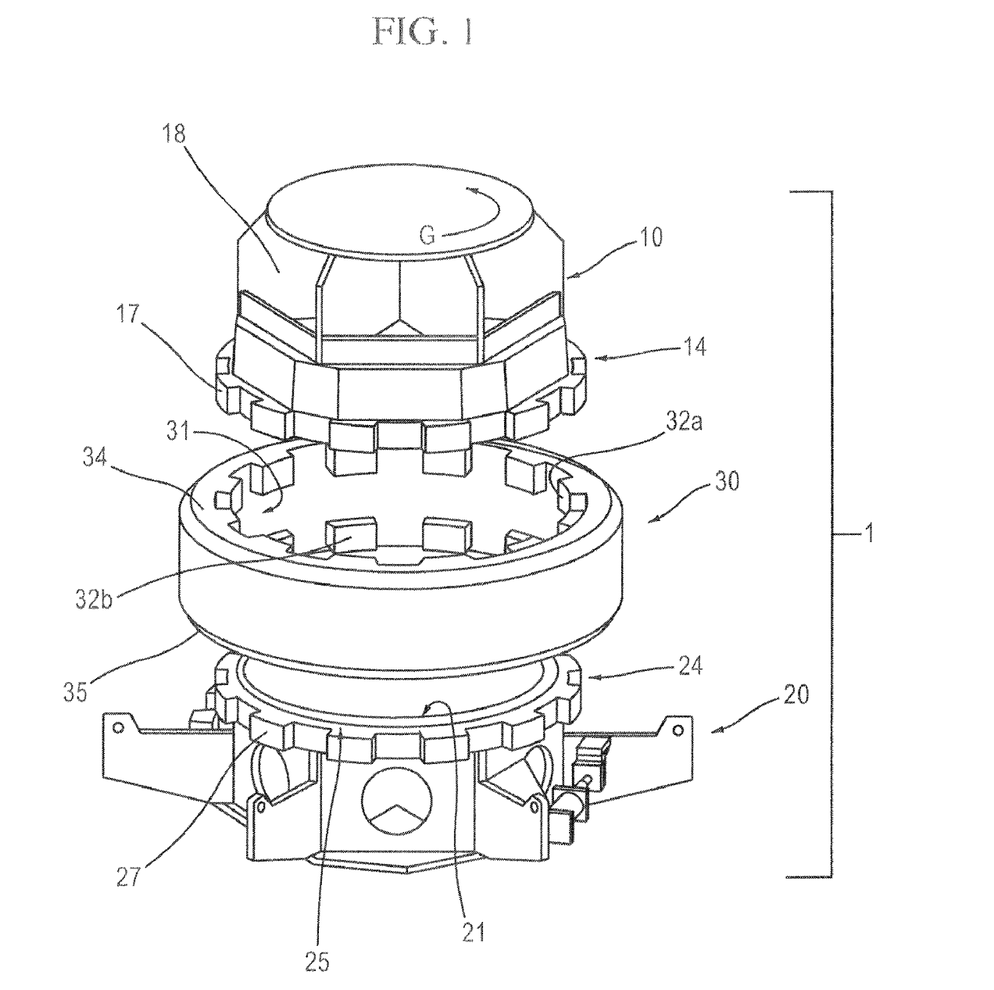
FIG. 1 is an exploded view of an exemplary containment vessel having a generally circular profile, in accordance with one embodiment of the present invention.

FIG. 1 is an exploded view of an exemplary containment vessel having a generally circular profile upon assembly, in accordance with one embodiment of the present invention. As shown in FIG. 1, the pressurizable chamber device or containment vessel 1 of this embodiment includes a lid portion 10, a base portion 20, and a ring portion 30, also interchangeably referred to herein as a "nut portion." In the embodiment shown, the lid portion 10 has a concave surface within its interior and the base portion 20 has a concave surface 21 within its interior (such concave surfaces also interchangeably referred to herein as "interior cavities"). The lid portion 10 and the base portion matingly fit together such that the lid portion flange 14 and the base portion flange 24 are generally aligned, and an internal chamber is formed by the combined concave surfaces of the lid portion and the base portion 21 when so mated. Lines or other conduits are connectable to couplings or other connectors for communicating pressurized fluid or other material within the conduits with the interior of the formed internal chamber. (See also FIG. 3 and accompanying description, below.)

Figure 2A:
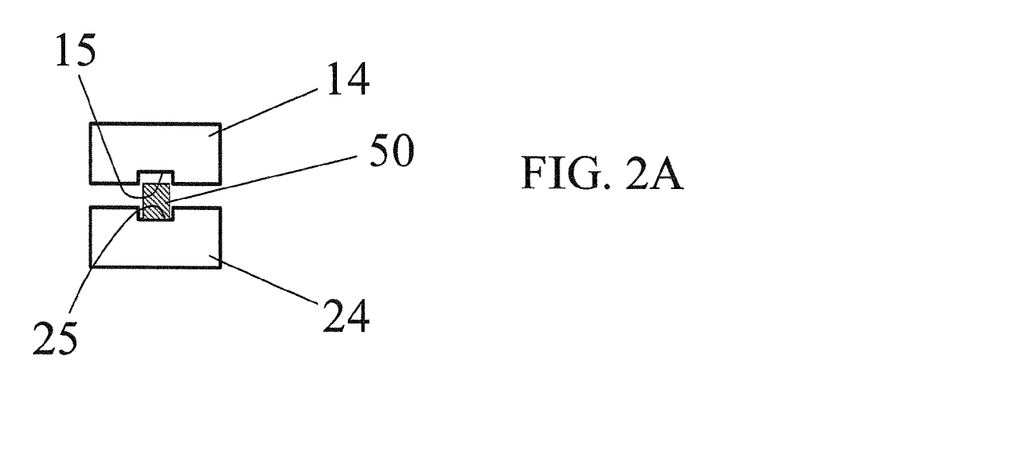
FIGS. 2A and 2B show close up views of a cross section of part of the lid portion flange and part of the base portion flange, in accordance with an embodiment of the present invention.

In the embodiment of FIG. 1, and as further shown in the partial cross-sectional view of FIG. 2A, the flanges 14, 24, each have a groove 15, 25 therein, such that a flexible seal element 50 is fittable into the grooves 15, 25 of both the lid portion flange 14 and the base portion flange 24 when matingly fit together. The flexible seal element 50, which may, for example, have an uncompressed thickness of about ⅜", maintains a gap between the lid portion flange 14 and the base portion flange 24 when sandwiched therebetween in an uncompressed position, and may have a lesser thickness A (e.g., about ½") upon being compressed, as further shown in the partial cross-sectional view of FIG. 2B. The flexible seal element 50 of this embodiment is compressible, such that the lid portion 10 and the base portion 20 may be drawn toward one another, compressing the flexible seal element 50, so as to maintain a seal therebetween, and thereby sealing the volume V of the internal chamber formed by the concave surfaces of the lid portion 10 and the base portion 20, as shown in cross section in FIG. 3. A pressure, such as a resin pressure that may be precisely regulated, may then be applied (e.g., via pressure delivered by lines or other conduits connected to openings in the lid portion 10 and/or the base portion 20), for example, to a mold contained within the internal chamber, such as a mold containing resins and fibers for producing a molded part or other product.

As best shown in FIG. 1, the outer flanges 14, 24 of each of the lid portion 10 and the base portion 20, respectively, has a plurality of teeth (also referred to interchangeably herein as "dogs") 17, 27 extending therefrom. As shown in cross-section in FIG. 4A, each of the teeth (or some of the teeth) 17 has a wedge 118 attached thereto or comprising a portion thereof.

Figures 4A, 4B:
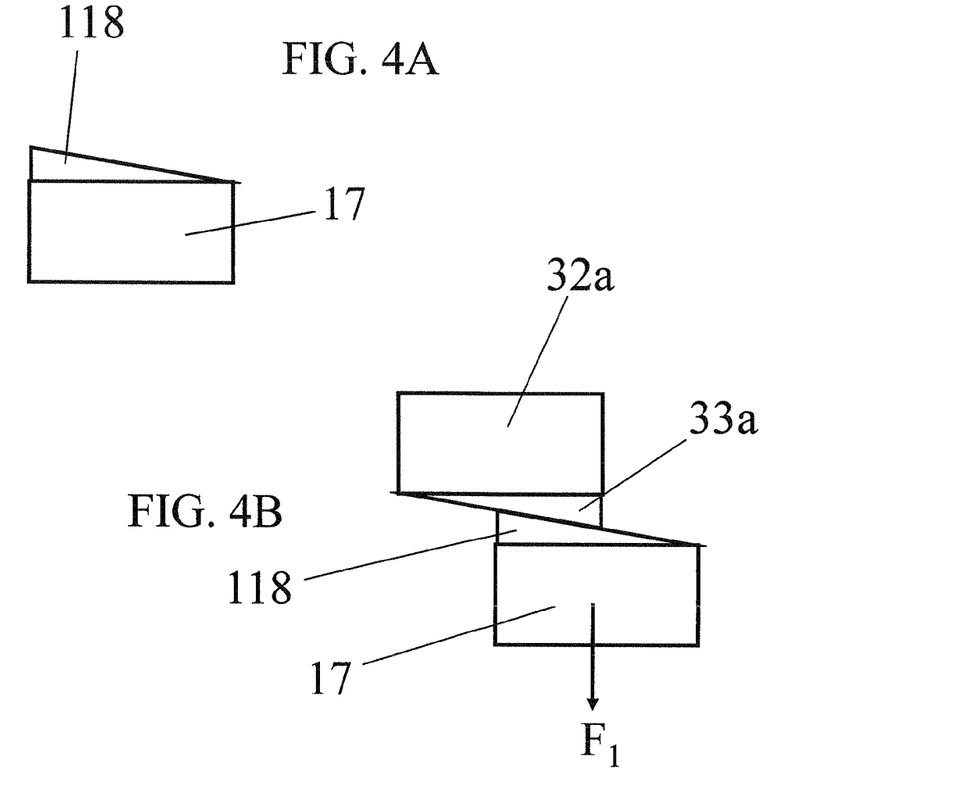
FIG. 4A presents a cross-sectional view of an exemplary wedge and dog for a tooth component.
FIGS. 4B and 4C show cross-sectional views of engaged wedges for flange and nut teeth, in accordance with an embodiment of the present invention.

The wedge 118 may be attached to the tooth 17 permanently, or semi-permanently, for example, such as via one or more screws, adhesives, welds, or other attachment mechanisms. One advantage of semi-permanently attaching each wedge 118 is that such a wedge 118 may be replaced easily, for example, when worn.

In the embodiment shown in FIG. 1, the nut portion 30 is ring-shaped, having an interior surface 31 that includes a plurality of nut teeth 32a, 32b arranged in two rows extending from the interior surface 31, a first row of teeth 32a being located near a first edge 34 of the nut portion 30 and the second row of teeth 32b being located near a second edge 35 of the nut portion 30. Each nut tooth (or some of the nut teeth) 32a, 32b has an attached wedge or comprises a wedge portion, the wedges being located so as to extend from the side of the nut tooth 32a, 32b to which the wedge is attached in a direction opposite the side of the nut tooth 32a, 32b located near the side edge 34, 35, respectively, of the nut portion 30 (i.e., the wedges thereby extending internally toward one another).

In one embodiment, the rows of nut teeth 32a, 32b are spaced such that the rows of flange teeth of the top portion 10 and base portion 20 may be passed therebetween, and then, upon rotational motion of the top portion 10 and the base portion 20 relative to the nut portion 30, the nut teeth 32a, 32b may be engaged with the flange teeth 17, 27, respectively, as further described below with reference to FIGS. 4B and 4C, so as to produce a compressing force between the top portion 10 and base portion 20 via sandwiched engagement of flange portions 14, 24 between the nut teeth 32a, 32b.

As shown in the partial cross-sectional view of FIG. 4B, each tooth (or some of the teeth) 17 located on the flange 14 of the top portion 10, as shown in FIG. 1, has a wedge 118 on or comprising its upper surface, as shown in FIG. 4B, and each tooth (or some of the teeth) 32a in the first row of the nut portion 30, as shown in FIG. 1, has a wedge 33a on or comprising its lower surface, as shown in FIG. 4B. Upon engagement of wedges 118 of the teeth 17 of the top portion 10 with the wedges 33a of the teeth 32a of the nut portion 30, as shown in FIG. 1, such as occurs when a rotational force is applied to the top portion 10 relative to the nut portion 30, as shown in FIG. 1, the interaction of the wedge portions 118, 33a produces a downward force $F_1$ as shown in FIG. 4B on each wedged tooth 17 of the top portion 10, and thus an overall downward force on the top portion 10, as shown in FIG. 1.

Figure 4C:
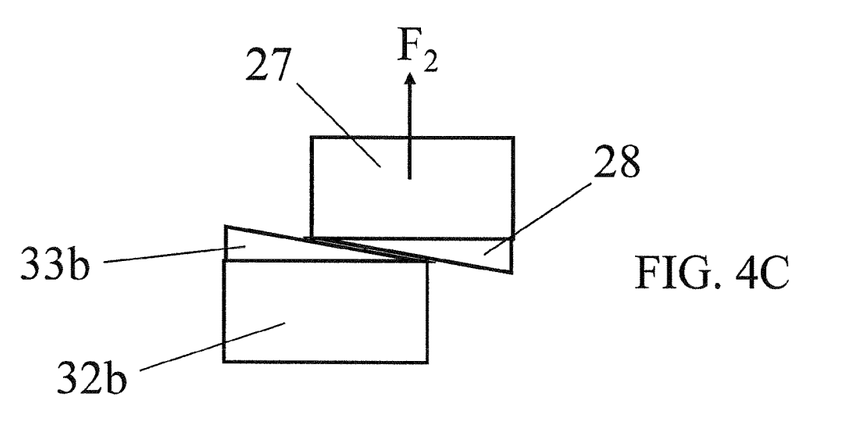

Similarly, as shown in FIG. 4C, each tooth (or some of the teeth) 27 on the flange 24 of the base portion 20 has a wedge 28 on or comprising its lower surface, as shown in FIG. 4C, and each tooth (or some of the teeth) 32b in the second row of the nut portion 30 has a wedge 33b on or comprising its upper surface, as shown in FIG. 4C. Upon engagement of the wedges 28 of the teeth 27 of the base portion 20, as shown in FIG. 1, with the wedges 33b of the teeth 32b of the nut portion 30, as shown in FIG. 1, such as occurs when a rotational force is applied to the nut portion 30, relative to the base portion 20, as shown in FIG. 1, the interaction of the wedge portions 28, 33b produces an upward force $F_2$, as shown in FIG. 4C, on each tooth 27 of the base portion 20, as shown in FIG. 1, and thus an overall upward force on the base portion 20, as shown in FIG. 1.

Figure 2B:
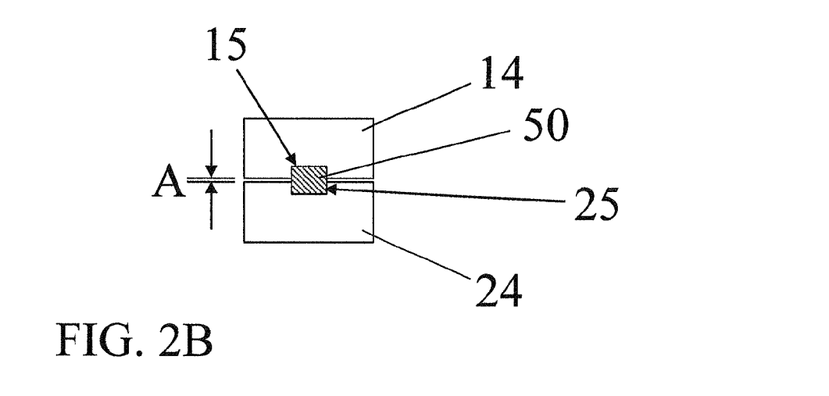
Figure 3:
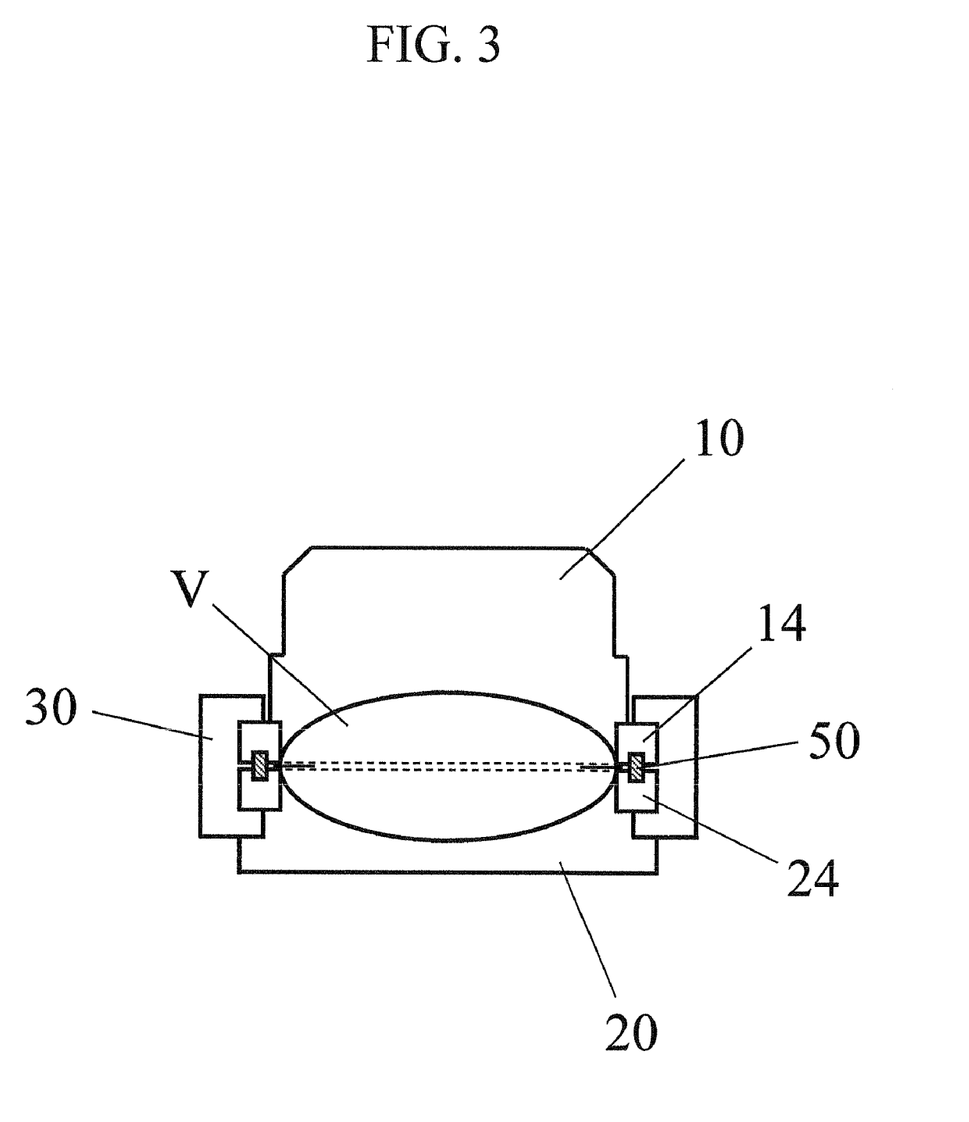
FIG. 3 shows a cross-sectional view of the exemplary containment vessel of FIG. 1 in an assembled position.

The combined downward force of the top portion 10 and upward force of the base portion 20, as shown in FIG. 1, compresses the flexible seal element 50, as shown in FIGS. 2B and 3, thereby sealing the volume V of the internal chamber formed by the concave portions of the top portion 10 and base portion 20, as shown in FIG. 3.

Figure 5:
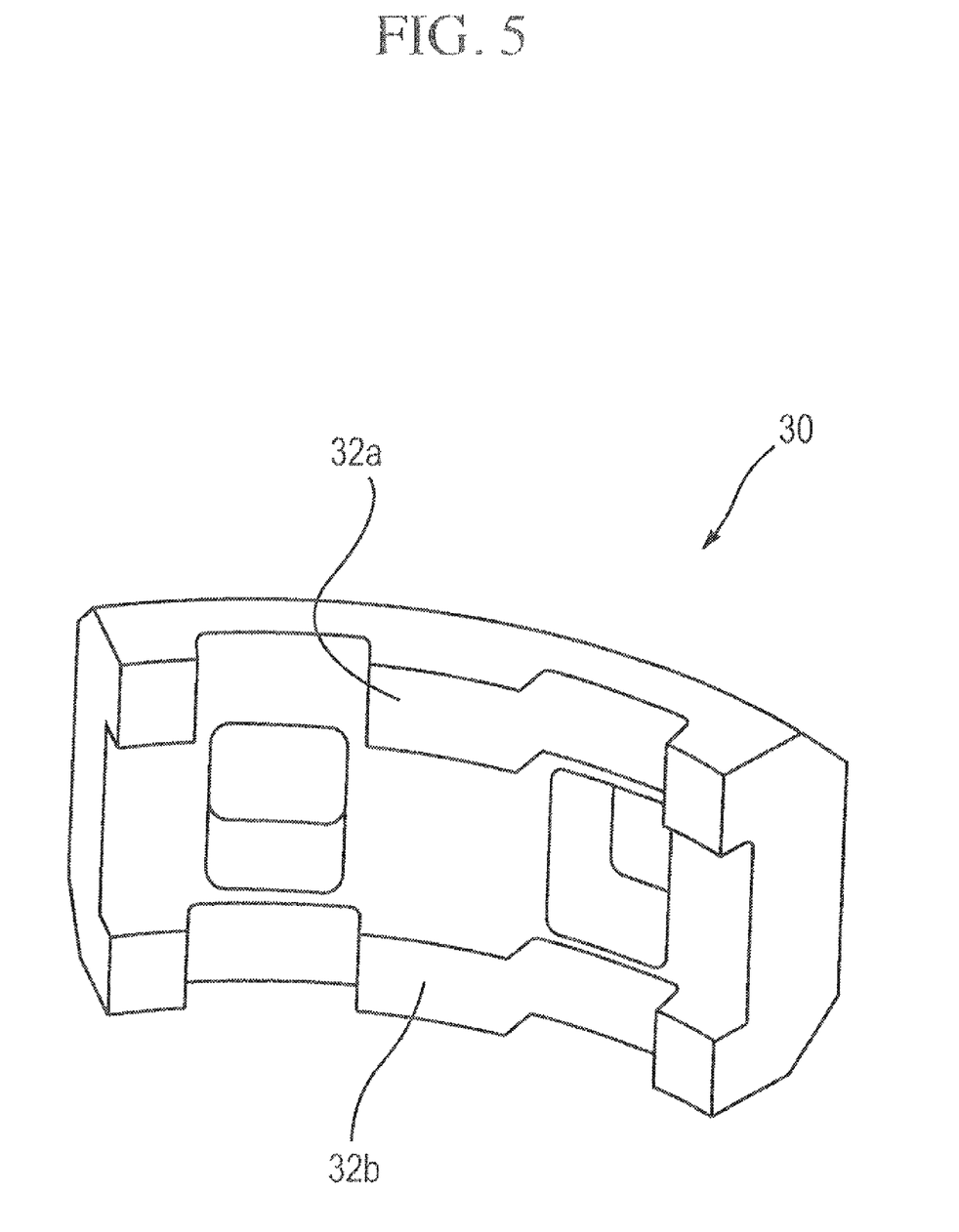
FIG. 5 illustrates a section of an exemplary ring portion of a containment vessel, in accordance with an embodiment of the present invention.

FIG. 5 illustrates a close up of a section of an exemplary ring portion 30 of a containment vessel, in accordance with an embodiment of the present invention.

Thus, in the embodiment of FIGS. 1-5, the top and base portions 10, 20 have generally circularly shaped flanges 14, 24, and each row of the nut teeth 32a, 32b is spaced such that the teeth 17, 27 extending from the generally circular flanges 14, 24 of the top and base portions 10, 20, respectively, may pass between the nut teeth 32a, 32b into the inner portion 31 of the nut portion 30, and, upon rotation of the nut portion 30 relative to the top and base portions 10, 20, the wedges 33a, 33b of the nut teeth 32a, 33b and the wedges of the flange teeth 17, 27 meshably engage, such that the top portion 10 and the base portion 20 are compressibly drawn toward one another between the two rows of nut teeth 32 via passing of the wedges on the flange teeth 17, 27 past the wedges on the nut teeth 32. In some embodiments, such motion and engagement of the teeth and wedges may be eased, for example, via use of an applied lubricant.

In the exemplary embodiment of FIGS. 1-5, the rotation of the top and base portions 10, 20 relative to the nut portion 30 may be made in any suitable manner, such as by fixing the position of the base portion 20 and by applying hydraulic pressure to the lid portion 10 (e.g., via vanes 18), such that rotation in rotary direction G of the lid portion 10 occurs relative to the base portion 20, the direction of rotation G of the lid portion 10 tending to be opposed by the nut portion 30 via the lid portion flange wedges 118 engaging a first row of the nut wedges 33a, and the second row of nut wedges 33b being oppositely engaged via the base portion flange wedges 28. Similarly, the top and base portions 10, 30 may be fixably held, for example, and the nut portion 20 rotated relative thereto, such as via application of a hydraulic pressure to the nut portion 20.

As shown in FIGS. 1-5, the flanges and teeth may generally extend outwardly from the top and base portions, and the nut teeth may extend inwardly from the nut portion. The flanges and teeth may likewise extend inwardly from the top and/or bottom portions, and teeth may likewise extend inwardly from the nut portion.

Figure 6:
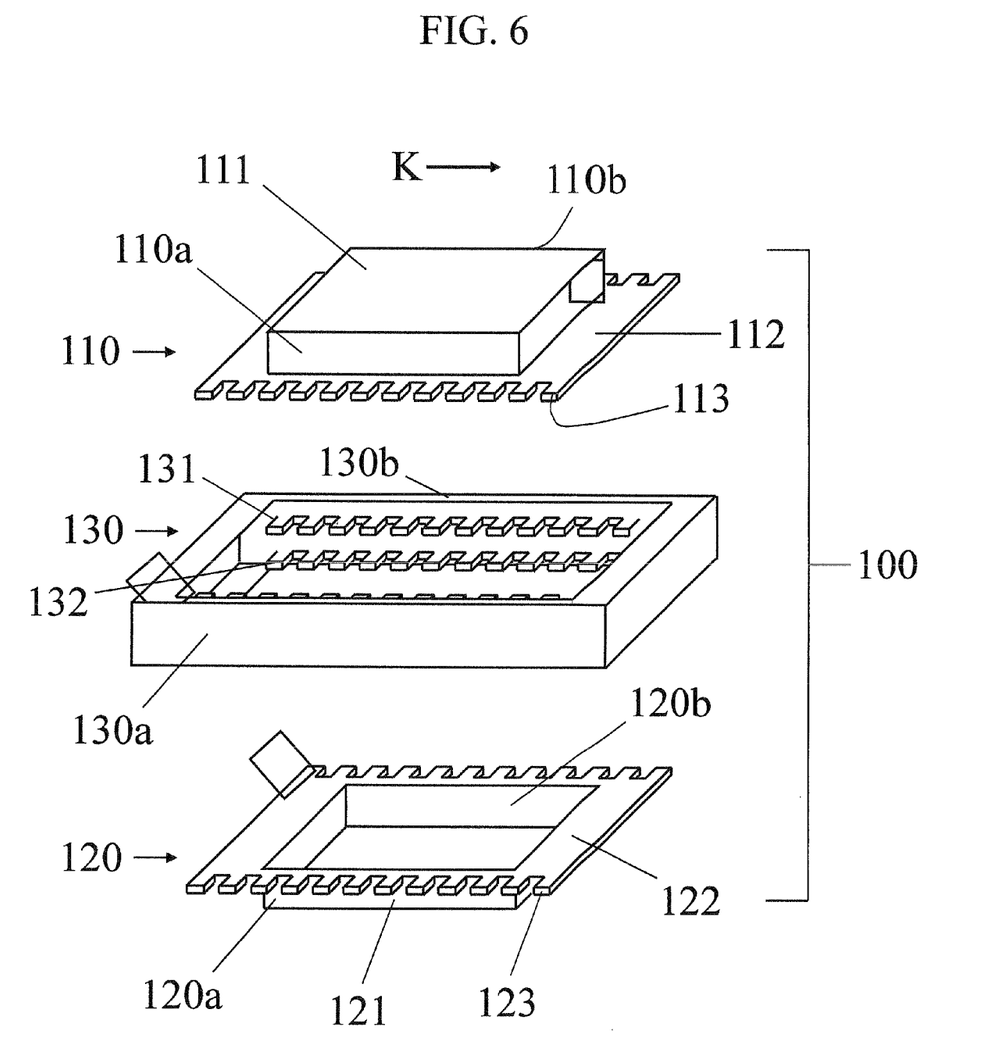
FIG. 6 shows an exploded view of an exemplary containment vessel having a pair of parallel sides, in accordance with an embodiment of the present invention.

FIG. 6 shows an exploded view of an exemplary containment vessel having a pair of parallel sides, in accordance with another embodiment of the present invention. As shown in FIG. 6, the containment vessel 100 of this embodiment includes a top portion 110, a base portion 120, and a nut portion 130. The top portion 110 has at least two parallel sides 110a, 110b, the base portion 120 has at least two parallel sides 120a, 120b, and the nut portion 130 has at least two parallel sides 130a, 130b. The top portion 110 also includes a first formed chamber portion 111, and the base portion 120 includes a second formed chamber portion 121, such that, when the top portion 110 and the base portion 120 are fit together, a internal chamber forms from the first formed chamber portion 111 and the second formed chamber portion 121.

Similarly to the operation of embodiment of FIGS. 1-5, in the embodiment shown in FIG. 6, the top portion 110 of the containment vessel 100 includes an outer flange 112 having rows of teeth 113, each tooth (or some teeth) 113 having an attached wedge or comprising a wedge portion on the upper side of the tooth 113, as viewed in FIG. 6. The base portion 120 likewise has an outer flange 122 having rows of teeth 123, with each tooth (or some teeth) 123 having an attached wedge or comprising a wedge portion on the lower side of the tooth 123, as viewed in FIG. 6. The nut portion 130 includes a first pair of parallel rows of teeth 131, 132 on one of the parallel sides 130b, and a second pair of parallel rows of teeth on the second of the parallel sides 130a. Each of the teeth (or some teeth) 131 in the first parallel row has an attached wedge or comprises a wedge portion on the bottom side of the tooth 131, as shown in FIG. 6, and each of the teeth (or some of the teeth) 132 in the second parallel row has an attached wedge or comprises a wedge portion on the upper side of the tooth 132, as shown in FIG. 6. Similarly, each of the teeth (or some of the teeth) in a first row on the second side 130a has a wedge on the bottom side, as shown in FIG. 6, and each of the teeth (or some of the teeth) in a second row on the second side 130a has a wedge on the upper side, as shown in FIG. 6.

Upon assembly, the teeth 113 of the top portion 110 are passed between the rows of teeth 131 in the nut portion 130, and the teeth 123 of the base portion 120 are passed between the rows of teeth 132 in the nut portion 130. Upon engagement of the teeth 113, 123 of the top and base portions 110, 120 with the teeth 131, 132 of the nut portion 130, the top portion 110 and the base portion 120 are driven toward one another via application of a generally linear motion of the top and base portions 110, 120, for example, relative to the nut portion 130, the interaction of wedges of the teeth 113, 123 and 131, 132 producing a downward force on the top portion 110 and an upward force on the base portion 120, as shown in FIG. 6, thereby compressably sealing the chamber (e.g., via use of a compressable seal between the top and base portions 110, 120) formed by the abutting first and second chamber portions 111, 121 of the top portion 110 and base portion 120, respectively.

For example, a force K having a direction parallel to the two parallel sides 110a, 110b of the top portion 110 is applied to the top portion 110. The wedges attached to the teeth 113 of the top portion 110 interact with the wedges attached to the teeth 131 in the first parallel row of the nut portion 130, so as to produce a downward force on the top portion 110, as shown in FIG. 6. The force applied to the top portion 110 tends thereby to apply a force in the same direction to the nut portion 130. Similarly, the wedges attached to the teeth 132 in the second parallel row of the nut portion 130 interact with the wedges attached to the teeth 123 of the base portion 120, so as to produce an upward force on the base portion 120, as shown in FIG. 6, such interaction occurring as a result of the fixed base portion opposing the force in direction K produced on the nut portion 130, as a result of the applied force from the top portion 110 on the nut portion 130, as further explained below.

Figure 7:
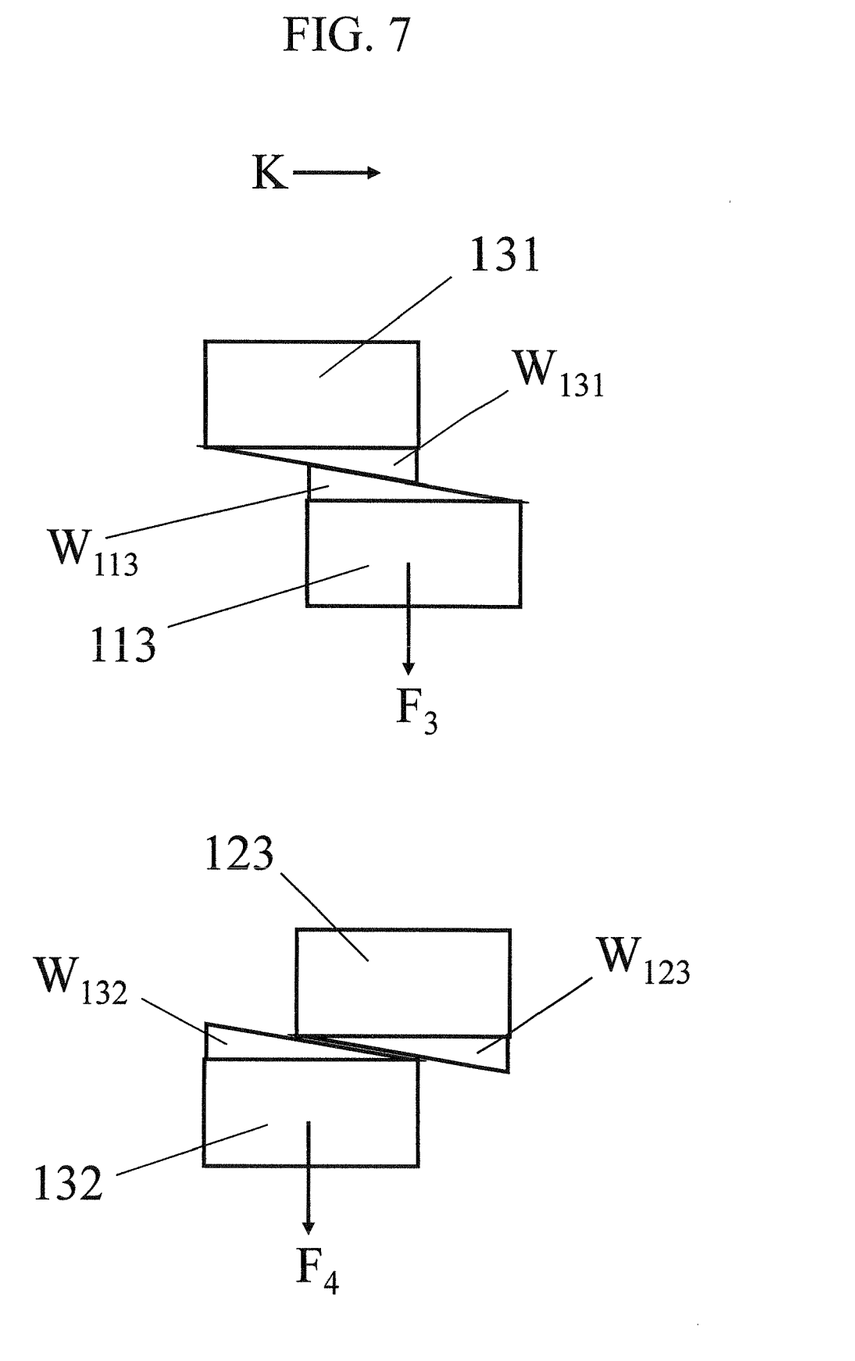
FIG. 7 presents a cross-sectional view of portions of engaged wedges for flange and nut teeth, in accordance with the embodiment of FIG. 6.

The overall compression between the top portion 110 and the base portion 120, as shown in FIG. 6, may be accomplished, for example, as shown in FIG. 7 (containing a representative cross-section of pairs of teeth 131, 113 and 132, 123 of the top, nut, and base portions 110, 130, 120), by appropriately fixing the position of the base portion 120 (as shown in FIG. 6) and by orienting the wedges attached to the flange and nut teeth, as shown in FIG. 7, such that the wedges $W_{113}$ of the top portion teeth 113 are oriented in the same direction as the wedges $W_{132}$ of the second row of the teeth 132 of the nut portion 130 (as shown in FIG. 6), and such that the wedges $W_{131}$ of the first row of teeth 131 of the nut portion 130 (as shown in FIG. 6) are oriented in the same direction as the wedges $W_{123}$ of the teeth 123 of the base portion 120, as shown in FIG. 6.

A linear force in direction K applied to the top portion (and thus to teeth wedges $W_{113}$) produces a downward force (in direction $F_3$) on the top portion as a result of the interaction of the teeth wedges $W_{113}$ of the top portion with the teeth wedges $W_{131}$ of the nut portion. The linear force in direction K tends to produce a resulting force in direction K upon the base portion via the nut portion, which is opposed by the fixed base portion, as a result of interaction of the teeth wedges $W_{113}$ of the top portion with the teeth $W_{131}$ of the nut portion and interaction of the teeth wedges $W_{132}$ of the nut portion with the teeth wedges $W_{123}$ of the base portion. As a result, a downward force (in direction $F_4$) is produced on the nut portion (relative to the fixed base portion). The downward force (in direction $F_3$) of the top portion and the downward force (in direction $F_4$) on the nut portion in combination (also further adding to the downward force on the top portion via the nut portion) draws the top portion and the base portion toward one another, such that a tightly sealed internal chamber may be produced by the chamber portions of the top and base portions.

Although exemplary embodiments of the present invention have now been discussed in accordance with the above advantages, it will be appreciated by one of ordinary skill in the art that these examples are merely illustrative of the invention and that numerous variations and/or modifications may be made without departing from the spirit or scope invention.

The invention claimed is:

1. A containment vessel, comprising:
a first chamber portion having at least two parallel sides and a first chamber portion flange, wherein the first chamber portion flange includes a plurality of toothed extensions, each of the plurality of toothed extensions having a first chamber tooth wedge attached thereto;
a second chamber portion having at least two parallel sides and a second chamber portion flange, wherein the second chamber portion flange includes a plurality of toothed extensions, each of the plurality of toothed extensions having a second chamber tooth wedge attached thereto; and
a nut portion having at least two parallel sides for forceably abutting the first chamber portion to the second chamber portion via engagement of the nut portion with the first chamber portion flange and the second chamber portion flange, the nut portion including a first plurality of toothed extensions, each of the first plurality of toothed extensions having a first nut tooth wedge attached thereto, and a second plurality of toothed extensions, each of the second plurality of toothed extensions having a second nut tooth wedge attached thereto;
wherein, upon engagement of the nut portion with the first chamber portion flange and the second chamber portion flange, each of the first chamber tooth wedges slidably engages one of the first nut tooth wedges and each of the second chamber tooth wedges slidably engages one of the second nut tooth wedges, such that the first chamber portion flange compressibly abuts the second chamber portion flange.

2. The containment vessel of claim 1, wherein:
the first chamber portion includes a first chamber portion housing encompassing a first interior cavity, the first chamber portion flange extending from the first chamber portion housing; and
the second chamber portion includes a second chamber portion housing encompassing a second interior cavity, the second chamber portion flange extending from the second chamber portion housing.

3. The containment vessel of claim 2, wherein the first chamber portion and the second chamber portion abut via the first chamber portion flange and the second chamber portion flange, such that the first interior cavity and the second interior cavity form an enclosed chamber.

4. The containment vessel of claim 1, wherein the nut portion slidably engages the first chamber portion flange and the second chamber portion flange.

5. The containment vessel of claim 1, further comprising:
a flexible seal element sandwichably located between the first chamber portion flange and the second chamber portion flange.

6. The containment vessel of claim 5, wherein at least one of the first chamber portion and the second chamber portion includes a groove for receiving the flexible seal element.

7. The containment vessel of claim 1, wherein at least one of each first chamber tooth wedge is attached to a first chamber toothed extension and each second chamber tooth wedge is attached to a second chamber toothed extension via an attachment mechanism.

8. The containment vessel of claim 7, wherein the attachment mechanism is selected from a group consisting of a screw, an adhesive, and a weld.

9. The containment vessel of claim 1, wherein each first nut tooth wedge is attached to one of the first plurality of toothed extensions via an attachment mechanism, and wherein each second nut tooth wedge is attached to one of the second plurality of toothed extensions via an attachment mechanism.

10. The containment vessel of claim 1, wherein the first chamber portion includes at least one opening for receiving a material for providing pressurization.

11. The containment vessel of claim 1, wherein at least one of the first chamber portion flange, the second chamber portion flange, and the nut portion includes at least one toothed extension having no attached wedge.

12. The containment vessel of claim 1, wherein the nut portion has a first pair or parallel rows of teeth on one of the parallel sides and a second pair of parallel rows of teeth on another one of the parallel sides.

13. The containment vessel of claim 1, wherein the plurality of toothed extensions of the first chamber portion flange are disposed on at least one of the parallel sides of the first chamber portion.

14. The containment vessel of claim 1, wherein the plurality of toothed extensions of the second chamber portion flange are disposed on at least one of the parallel sides of the second chamber portion.

15. A containment vessel, comprising:
a first chamber portion having a first chamber portion flange, wherein the first chamber portion flange includes a plurality of teeth, and wherein at least a subplurality of the plurality of first chamber portion teeth have first chamber portion teeth wedges attached thereto;
a second chamber portion having a second chamber portion flange, wherein the second chamber portion flange includes a plurality of teeth, wherein at least a subplurality of the plurality of second chamber portion teeth have second chamber portion teeth wedges attached thereto; and
a nut portion for wedgeably abutting the first chamber portion and the second chamber portion, the nut portion including a first plurality of teeth and a second plurality of teeth, wherein a first subplurality of the first plurality of nut portion teeth have first nut teeth wedges attached thereto, and wherein a second subplurality of the second plurality of nut portion teeth have second nut teeth wedges attached thereto;
wherein the first plurality of nut portion teeth, the second plurality of nut portion teeth, the plurality of first chamber portion teeth, and the plurality of second chamber portion teeth are spaceably distributed, such that the plurality of first chamber portion teeth are able to pass between the first plurality of nut portion teeth, and such that the plurality of second chamber portion teeth are able to pass between the second plurality of nut portion teeth; and
wherein the subplurality of first chamber portion teeth wedges, the subplurality of second chamber portion teeth wedges, the first plurality of nut portion teeth wedges, and the second plurality of nut portion teeth wedges are each situated and oriented so as to slidably engage, such that the first chamber portion and the second chamber portion are drawn together by a linear motion of the nut portion relative to the first chamber portion and the second chamber portion.

16. A containment vessel, comprising:
a first chamber portion enclosing an interior surface and having a pair of parallel edges, wherein a first chamber portion flange extends from each of the pair of parallel edges of the first chamber portion, and wherein the first chamber portion flange includes a plurality of teeth, each of the plurality of first chamber portion teeth having first chamber portion teeth wedges attached thereto;
a second chamber portion enclosing an interior surface and having a pair of parallel edges, wherein a second chamber portion flange extends from each of the pair of parallel edges of the second chamber portion, and wherein the second chamber portion flange includes a plurality of teeth, each of the plurality of second chamber portion teeth having second chamber portion teeth wedges attached thereto;
a flexible seal element sandwichably locatable between the first chamber portion flange and the second chamber portion flange; and
a nut portion having a pair of parallel edges, wherein a first plurality of teeth and a second plurality of teeth extend from each of the pair of parallel edges, wherein the first plurality of nut portion teeth have first nut teeth wedges attached thereto, and wherein the second plurality of nut portion teeth have second nut teeth wedges attached thereto;
wherein the first plurality of teeth of the nut portion are slidably engageable with the first chamber portion flange teeth, and wherein the second plurality of teeth of the nut portion are slidably engageable with the second chamber portion flange teeth, such that the first chamber portion flange and the second chamber portion flange compress the flexible seal element sandwiched therebetween; and
wherein an enclosed chamber is formed by the interior surface of the first chamber portion and the interior surface of the second chamber portion.

17. A method for pressurizing a containment vessel, the containment vessel including a first chamber portion having a first chamber portion flange, wherein the first chamber portion flange includes a plurality of toothed extensions, each of the plurality of toothed extensions having a first chamber tooth wedge attached thereto; a second chamber portion having a second chamber portion flange, wherein the second chamber portion flange includes a plurality of toothed extensions, each of the plurality of toothed extensions having a second chamber tooth wedge attached thereto; and a nut portion engageable with the first chamber portion to the second chamber portion, the nut portion including a first plurality of toothed extensions, each of the first plurality of toothed extensions having a first nut tooth wedge attached thereto, and a second plurality of toothed extensions, each of the second plurality of toothed extensions having a second nut tooth wedge attached thereto; the method comprising:

slidably engaging each of the first chamber tooth wedges with one of the first nut tooth wedges in a linear direction;

slidably engaging each of the second chamber tooth wedges with one of the second nut tooth wedges in a linear direction;

applying a directional force to at least one selected from a group consisting of the first chamber portion, the second chamber portion, and the nut portion such that the first chamber portion forceably abuts the second chamber portion via a slidable engagement of each of the first chamber tooth wedges with one of the first nut tooth wedges and a slidable engagement of each of the second chamber tooth wedges with one of the second nut tooth wedges.

18. The method of claim 17, wherein the first second chamber portion is positionally fixed relative to the first chamber portion and the nut portion.

19. The method of claim 18, wherein the first chamber portion, the second chamber portion, and the nut portion are aligned in a first direction, and wherein the directional force is applied in a second direction orthogonal to the first direction.

20. The method of claim 18, wherein the containment vessel includes a flexible seal component that is compressed via the first chamber portion abutting the second chamber portion.

* * * * *